United States Patent
Wang et al.

(10) Patent No.: US 8,993,148 B2
(45) Date of Patent: Mar. 31, 2015

(54) RECHARGEABLE LITHIUM ION BUTTON CELL BATTERY

(76) Inventors: Fang Wang, Zhuhai (CN); Fajiong Sun, Zhuhai (CN)

( * ) Notice: Subject to any disclaimer, the term of this patent is extended or adjusted under 35 U.S.C. 154(b) by 863 days.

(21) Appl. No.: 12/881,179

(22) Filed: Sep. 14, 2010

(65) Prior Publication Data
US 2011/0091753 A1    Apr. 21, 2011

(30) Foreign Application Priority Data
Oct. 21, 2009    (CN) .......................... 2009 1 0213615

(51) Int. Cl.
| H01M 6/42 | (2006.01) |
|---|---|
| H01M 6/12 | (2006.01) |
| H01M 10/0587 | (2010.01) |
| H01M 2/02 | (2006.01) |
| H01M 2/16 | (2006.01) |
| H01M 2/22 | (2006.01) |

(52) U.S. Cl.
CPC ........ *H01M 10/0587* (2013.01); *H01M 2/0222* (2013.01); *H01M 2/1686* (2013.01); *H01M 2/22* (2013.01)
USPC ............................................. 429/157; 429/94

(58) Field of Classification Search
USPC .................................................. 429/94, 157
See application file for complete search history.

(56) References Cited

U.S. PATENT DOCUMENTS

| 6,117,589 | A  * | 9/2000 | Satou et al. ................... 429/211 |
|---|---|---|---|
| 6,153,337 | A  * | 11/2000 | Carlson et al. ............... 429/247 |
| 7,575,829 | B1 * | 8/2009 | Nakahara et al. ............. 429/175 |
| 2004/0062983 | A1* | 4/2004 | Abe et al. ....................... 429/162 |
| 2006/0006063 | A1* | 1/2006 | Tanaka et al. .................. 204/280 |
| 2009/0325045 | A1* | 12/2009 | Miyahisa et al. ............... 429/94 |
| 2012/0015224 | A1* | 1/2012 | Pytlik et al. ..................... 429/94 |

FOREIGN PATENT DOCUMENTS

DE    10 2009 030 359.6    * 12/2009  ............. H01M 2/02

\* cited by examiner

*Primary Examiner* — Muhammad Siddiquee

(57) ABSTRACT

A rechargeable lithium ion button cell battery having a sealed housing comprises an inner casing and an outer casing, both casings have at least one flat area as top or bottom of the battery, and a round or oval side wall vertically formed to the flat area. Said side walls are single wall not folded double walls. An insulation gasket is positioned between said side walls, and the outer casing opening is mechanically crimped to complete the seal of the battery. Inside the sealed housing the anode & cathode electrodes are spiral wound with separator to be a round or oval roll. Said roll axis is vertical to the said flat areas of the casings. The two electrodes are tapered in width and comprise current collectors of metal foils coated with lithium-intercalating active materials, leaving small area of uncoated metal foils as welding tabs for connecting to the casings. The tabs are welded to the casings respectively, or for the tab of the electrode which connecting to outer casing, welded to an aluminum flake first and said flake is pressed on the outer casing by said gasket. Two insulation washers could be applied to inner side of the casings to prevent short circuit. Such battery has high energy density, low impedance, high reliability and long cycle life.

10 Claims, 4 Drawing Sheets

RECHARGEABLE LITHIUM ION BUTTON CELL BATTERY

REFERENCES CITED

U.S. PATENT DOCUMENTS

| | | | | |
|---|---|---|---|---|
| 5,427,874 | May 1994 | Sugeno | 429/194 | Non-aqueous liquid electrolyte secondary cell |
| 5,582,930 | May 1995 | Oltman et al. | 429/27 | High energy density metal-air cell |
| 5,629,107 | January 1996 | Shioda et al. | 429/128 | Coin-shaped lithium battery |
| 6,248,476 | June 1999 | Sun et al. | 429/224 | Metal air cathode and electrochemical cells made therewith |
| 6,265,100 | February 1998 | Saaski et al. | 429/163 | Rechargeable battery |
| 6,451,472 | April 2000 | Chang et al. | 429/94 | Lithium battery and manufacturing method thereof |
| 6,567,527 | August 2000 | Baker et al. | 381/323 | Elongated oval battery assembly for canal hearing device |
| 6,713,215 | January 2001 | Watanabe et al. | 429/231.5 | Non-aqueous electrolyte rechargeable batteries |
| 6,761,995 | August 2001 | Uyama et al. | 429/171 | Coin-shaped battery |
| 6,794,082 | September 2001 | Mori et al. | 429/174 | Alkaline battery |
| 6,984,468 | January 2004 | Rubino et al. | 429/174 | Hermetically sealed coin cell |
| 7,276,092 | March 2004 | Holl et al. | 29/623.2 | Electrochemical element in the form of a button cell, and a method for producing an electrochemical element |
| 7,348,102 | March 2005 | Li et al. | 429/233 | Corrosion protection using carbon coated electron collector for lithium-ion battery with molten salt electrolyte |

FIELD OF INVENTION

This invention relates to rechargeable lithium-ion electrochemical battery, and more particularly to a very small size Lithium-Ion battery used in small electronic devices such as hearing aids, earphones or watches, in a shape of coin or button like, commonly known as rechargeable Lithium-Ion button cell battery.

BACKGROUND OF THE INVENTION

Rechargeable lithium-ion and lithium-polymer batteries are used widely. Big batteries are used in electric vehicles or hybrid vehicles, storage batteries for solar or wind mill. Small batteries are used in notebook computers, mobile phones and other portable devices such as MP3 player, GPS receivers, and bluetooth earphones. These batteries have electrodes of lithium intercalating materials which is safe as there are no lithium in the form of metal exists in the batteries. The energy density is also much higher than other rechargeable technology like Ni—MH or Ni—Cd batteries. The trend to use rechargeable lithium based batteries to replace the primary batteries or other chemistry rechargeable batteries, in many aspects, is clear and present.

For portable electronic devices, batteries with higher volumetric energy density are always preferred. Such devices do not have space to contain a big battery. Soft pouch or lithium polymer prismatic battery in bluetooth earphones are one of the typical application. One example as U.S. Pat. No. 6,451,472 described, the spiral wound electrodes are pressed into prismatic shape and put into pouch, then using heat to melt the rim of plastic coated on aluminum foil core layer to complete the seal. Such batteries could be as small as 0.3 cubic centimeters at size of 4 mm×8 mm×10 mm, to its typical size of bluetooth earphone battery of about 1 cubic centimeter at size of 4 mm×11 mm×22 mm. Said battery has at least 3 sealing rims, two side rims, and one top rim, where the terminals come through. At this small volume, these sealing rims usually at a thickness of 0.15 mm to 0.50 mm, occupy quite a significant volume and leave less space for the active materials or the electrodes inside the battery pouch. So this kind of soft pouch battery is not the ideal candidate for very small electronic devices like hearing aid.

Button cell design for lithium based rechargeable batteries could be a better solution for very small electronic devices, while it has to have the least non-active volume for its casing and sealing configuration. In lithium based batteries, different sealing methods are used including glass-to-metal seal, laser welding or plasma welding, one example as described in U.S. Pat. No. 6,984,468. These sealing methods using thick casing design occupying significant volume so not suitable for lithium based button cell batteries, which commonly sealed by mechanical crimping of the outer casing pressed on the gasket and inner casing. Different from zinc air batteries, the inner casing side wall are folded double side walls for these lithium based button cells, as described in U.S. Pat. No. 5,629,107, U.S. Pat. No. 6,713,215 and U.S. Pat. No. 7,276,092.

Such folded double side walls give reliable seal of the battery because it has the highest closing pressure between the ending rim of the folded double side wall and the insulation gasket. The rim of the folded side wall is actually projected into the gasket by closing crimping force. Obviously the disadvantage is that the inner volume for active materials is reduced by these double walls.

Alternative button cell design uses single side wall, examples for hearing aid primary zinc air battery which being used for 3 decades very successfully, as U.S. Pat. Nos. 5,582,930 and 6,248,476. These zinc air button cells use every efforts to reduce its non-active casing space, by using thinner casing materials, by using single side wall anode top casing, to have high volumetric energy density. Such battery is also sealed by mechanical crimping of the battery outer casing to press the gasket firmly on the inner casing.

In U.S. Pat. No. 6,265,100 a rechargeable lithium button cell is described. It has an outer casing, but the inner casing or inner top does not have a side wall at all, it is just a flat round plate. How to seal such a battery was not discussed. No mechanical crimping means is available on the battery housing, no glass-to-metal seal or welding being applied. The inner space could be maximized by such design but how to realize the closing to seal the battery is quite questioned.

The volumetric energy density of rechargeable lithium based button cell is not only affected by the casing design and the sealing means design, but also affected by the inner electrodes arrangement. Some prior arts are:

a. Two solid plates of electrode, as U.S. Pat. No. 6,713,215 and U.S. Pat. No. 7,276,092, not with thin film type of electrodes. Such design is not suitable for lithium-ion rechargeable button cells.

b. Thin film type of electrodes piece by piece in stack, all layers parallel to battery top or bottom, one commercial product with brand name PowerDisc detail PD2032 at www.powercellkorea.com. Route JD company, Korea. Another design example is as U.S. Pat. No. 6,265,100. Such design uses multi-layers round thin film electrodes stacked with separators. The stack is round and occupies most space of the inner volume of the battery. However it has to leave a ring-like free space to let the current collectors of each layer folded and linked to gather together and connecting to the casings.

c. Thin film type of electrodes spiral wound to be a roll and pressed to prismatic shape, like the prismatic soft pouch battery design, roll axis is parallel to battery top or bottom. This design is simple than stack, but as the pressed roll is in rectangular shape, to put it into round battery casing wastes four arcing space between the electrodes and battery casing, hence the energy density is low. Such design is widely used in China made lithium ion rechargeable button cell batteries available in the market.

d. Thin film electrodes spiral wound roll, in its cylindrical shape, axis is vertical to battery top or bottom, just like the traditional cylindrical lithium-ion batteries one example as U.S. Pat. No. 5,427,874. Similar design was also mentioned in U.S. Pat. No. 6,265,100. No actual lithium-ion button cell is made in this way yet.

This last spiral wound electrodes arrangement with axis vertically to the button cell flat top or bottom, has high utility of the inner volume of the cylindrical cell. The prior arts electrodes width is constant at its full length and after being wound, the roll height is constant. This is not an issue in cylindrical lithium ion batteries as they are quite tall and the closing means is at the very top of the battery and does not interfere with the electrodes, structure example as U.S. Pat. No. 5,427,874. But for button cell, the space is very limited and the closing means is different from cylindrical cell. The button cell cap is only flat in the middle area, as it has to have a closing rim or closing shoulder wherein the height is lower than the flat top area, the electrodes figuration also need to be carefully designed to adapt to this height change. So the electrodes with constant width are not suitable or could not fully utilize the inner space of the battery. This was not mentioned in any prior arts.

Such vertical wound electrodes also need to be connected to the battery casing in a reliable, low impedance, space-saving, and easy-to-assembly way, which is another challenge to have a high performance button cell. The best solution for reliable connection is by welding, to connect the electrodes current collectors to the battery casings. This is similar like the cylindrical cell design but very difficult to be implemented in the same way into the very small button cell. The other solution could be by a face-to-face contact, to have the electrode roll outer surface to contact the inner surface of battery casing, but such design does not have stable impedance in battery cycles, because the electrodes will shrink in discharge and expand in charge, so the contact tightness varies with such shrink/expand cycle, and the battery performance is not stable.

Another consideration for high performance rechargeable lithium-ion button cell is the cycle life, it is preferred to be as long as possible, at least several hundreds cycles. The lithium-ion batteries are charged at 4.2V or even higher, at this potential, the cathode current collector and cathode casing metal wherein contacting the electrolyte are easy to be oxidized. The electrons will be lost from these metals then the metals become metal ions and resolve into electrolyte. These ions are impurities to the active materials and hence the battery may fail or has low cycle life. And so, aluminum or aluminum coated material is commonly used as the cathode current collector and cathode casing, because aluminum is very resistant to such oxidizing potential due to its surface oxidation film which protect it from being further oxidized.

In the lithium button cell casing design, stainless steel is commonly used, which also has some level of resistant to the oxidizing potential during charge, but not as good as aluminum. The lithium ion button cell batteries in the market with stainless steel casings usually have the cycle life of 300 cycles at 80% remaining capacity. This is good, but not good enough. Aluminum casing is not preferred because they are quite soft and it would be too thick occupying too much space for button cell if they having enough strength. Clad metal with stainless steel and aluminum could be used to combine the benefits of strength and anti-corrosion of each metal. Coating of aluminum or carbon on the cathode casing could be another solution as mentioned in U.S. Pat. No. 7,348,102. By other words, if the button cell is required to have long cycle life, cathode current collector and casing have to be carefully chosen using anti-corrosion means and/or materials.

Therefore, it is the object of the present invention to provide a reliable and minimized sealing means, for the rechargeable lithium-ion button cell, to leave maximum space for inner materials, to make the battery with high energy density.

It is another object of the present invention to provide novel electrodes configuration and arrangement in the battery housing, to fully utilize the inner volume, so the battery will have even higher energy density.

It is still another object of the present invention to provide reliable connection means of electrodes to the casings, to have stable low impedance, so the battery is high performance.

It is yet another object of the present invention to provide the right material and design of the cathode current collector and the cathode casing, to make them free from corrosion or oxidation during cycles, and provide long cycle life for such lithium-ion button cell battery.

SUMMARY OF THE INVENTION

The objects of the present invention are attained in an electrochemical rechargeable lithium-ion button cell battery briefly described below:

A sealed housing comprises an inner casing and an outer casing, both casings having at least one small flat area as top or bottom of the battery, and a round or oval side wall vertically formed to the flat area. Said side walls are single wall not folded double walls. The inner casing has a shoulder on the rim of the flat top area connecting its flat top area to the side wall. An insulation gasket is positioned between said inner casing and said outer casing side walls, and the outer casing opening rim is mechanically crimped to press the gasket firmly on the inner casing shoulder to complete the seal of the battery.

Inside the sealed housing the anode & cathode electrodes are spiral wound with separator to be a round or oval roll. Said roll axis is vertical to the flat area of the casing top and bottom, and parallel to the casing side walls. The electrodes are tapered in width, to adapt the inner space height changes from the center of the casing to the shoulder rim. The two electrodes comprise current collectors of metal foils coated with lithium-intercalating active materials. Commonly the anode current collector is copper foil, the cathode current collector is aluminum foil. The foils are not fully coated with active materials, areas of small projected tabs are uncoated, for welding the current collector to the battery casings. The anode copper tab is designed at the wider end of the tapered electrode, and welded to the anode casing at its center. The cathode aluminum tab is designed at the narrower end of the tapered electrode, for the convenience of battery assembly, and it could be connected to the cathode casing in two options:

One option is to weld it to an aluminum round flake, and said flake be pressed by said battery gasket in next assembly step to have reliable contact with the outer casing. This option uses quite small tab to be welded easily on the aluminum flake which is flat and round and not interfere with welding head during assembly. This option also has great advantage in battery cycle life because the aluminum flake covers the inner surface of battery outer casing commonly stainless steel, to prevent it from being oxidized by the charging potential and electrolyte.

The other option is to weld the tab directly to the said outer casing. This option needs much longer tab because if not, the side wall of outer casing would interfere with welding head during assembly. If the inner surface of the outer casing is stainless steel, such design would also sacrifice some cycle life because the electrolyte will directly contact with the inner surface on this cathode side, and in battery charging process, the high charging potential with electrolyte could oxidize the stainless steel. However this is acceptable in many applications as the cycle life still could be several hundreds. If the cathode casing uses the clad metal or plated material with aluminum layer at the inner surface, or use other anti-corrosion materials coated on the inner surface, battery cycle life also could be very good. But these materials or processes are complicated or quite thick and may not be preferred.

Two adhesive insulation washers made by thin polymeric materials could be applied to the inner top and bottom surfaces of the inner and outer casings respectively. The washer attached to the inner casing is ring shape, leaving a hole at the center for the welding of one electrode tab to the inner casing, usually anode electrode and anode casing. The other washer applied to the outer casing is round shape, attaching to the said welded aluminum flake, or directly to the welded inner surface of the outer casing. These washers could prevent short circuit between the edges of wound electrodes and the casings.

DETAILED DESCRIPTION OF THE PREFERRED EMBODIMENTS

Figure 1:
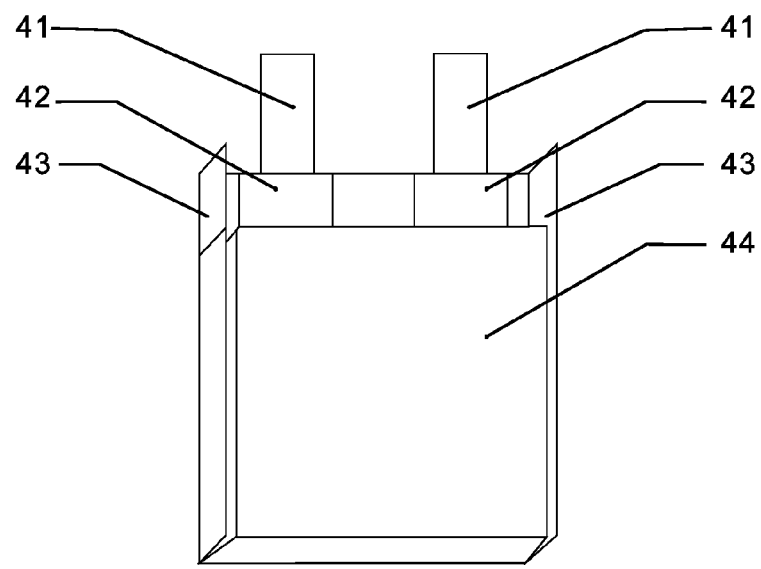
FIG. 1 is a lithium-polymer soft pouch battery for portable electronics like bluetooth earphones.

FIG. 1 is the prior art lithium-ion soft pouch battery also commercially called lithium polymer battery, which is the most popular power source for today's mini portable electronics like bluetooth earphones. The main body 43 is compact and has quite high energy density, but when including the sealing area 42 and 43, current collector 41, these non-reactive volumes will make the whole energy density lower significantly.

Figure 2:
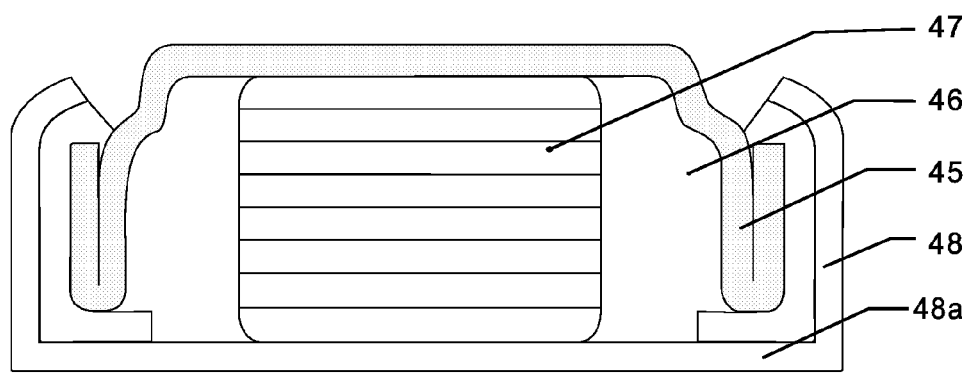
FIG. 2 is a cross-sectional view of a rechargeable lithium-ion button cell battery available on the market with double wall casing and electrodes are parallel to the top and bottom flat area.
Figure 3:
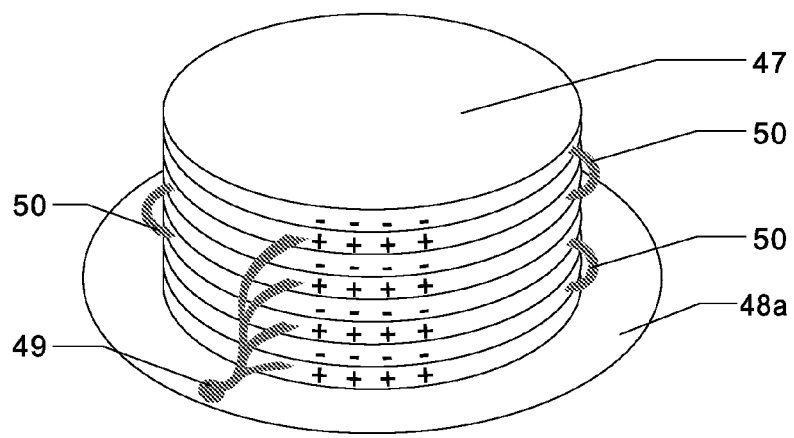
FIG. 3 is the structure of the electrodes of the battery of FIG. 2, stacked electrodes.
Figure 4:
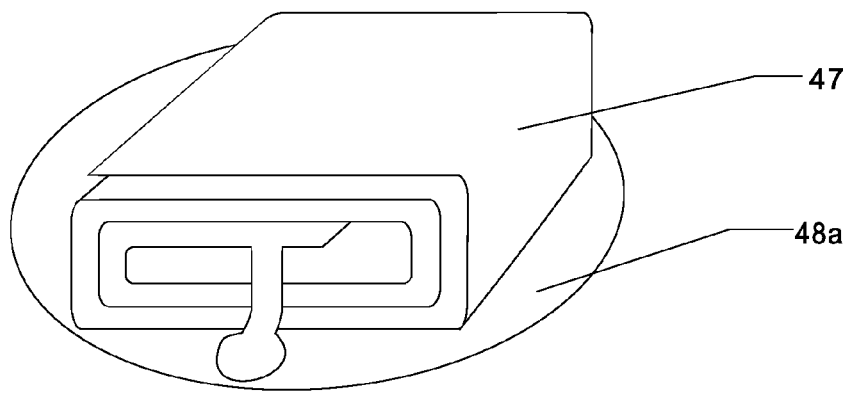
FIG. 4 is the structure of the electrodes of the battery of FIG. 2, wound electrodes pressed to be flat.

FIG. 2 is the prior art lithium-ion rechargeable button cell available in the market. The double side wall 45 occupies significant volume, and the inner electrodes structure 47 could be in two designs: One is as FIG. 3, the stacked electrodes, which are in round shape, leaving the ring-like space 46 for cathode current collectors 49 to be gathered and welded to cathode casing, and the anode electrodes are stacked with folded current collectors 50 which linking each piece of the round electrodes also at space 46, leaving the top piece of anode to contact the anode casing, without welding. Another design is as FIG. 4, the spiral wound electrodes 47 are pressed into flat and rectangle in shape, which leave even more wasted arcing space at 46 between the electrode roll edges and the inner rim of the casing side wall 45. Cathode electrode is welded to casing and anode electrode is in face-to-face contact to the anode casing. 48a is the cathode bottom flat area of outer casing 48 and clearly the 48a is not fully occupied. In both designs the electrodes are parallel to the flat top or bottom of the battery. These kinds of button cell batteries are not competitive to FIG. 1 batteries on the energy density and not being used widely.

Figure 5:
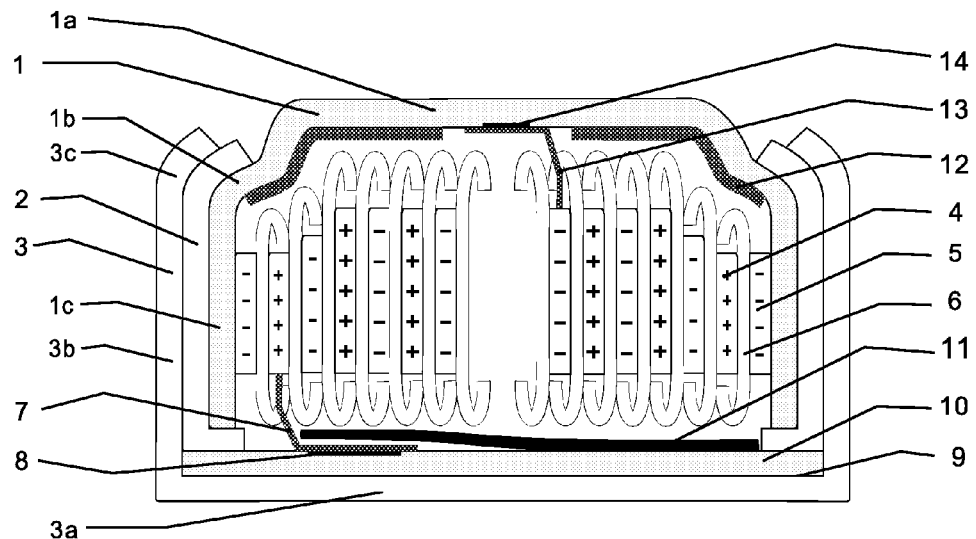
FIG. 5 is a cross-sectional view of the present invention rechargeable lithium-ion button cell battery.

FIG. 5 is the detailed illustration of the present invention embodiment. The battery inner casing 1 usually stainless steel, has at least one small flat area 1a, side wall 1c vertical to 1a and it is single wall not folded at its opening, and a shoulder 1b connecting them. The side wall 1c is usually round and could be oval, for an oval shape button cell. The inner casing 1 is usually anode casing. The outer casing 3 usually stainless steel, also has a flat area 3a and vertical side wall 3b, 3b is usually round and could be oval, for an oval shape button cell. The outer casing is usually cathode casing. The insulation gasket 2 usually made by polypropylene coated with battery sealant is positioned between side wall 1c and 3b, covering the opening end of inner gasket 1c by its footing rim, and the outer casing opening rim 3c is mechanically crimped to press the gasket firmly on the inner casing shoulder 1b to complete the seal of the battery.

Figure 6:
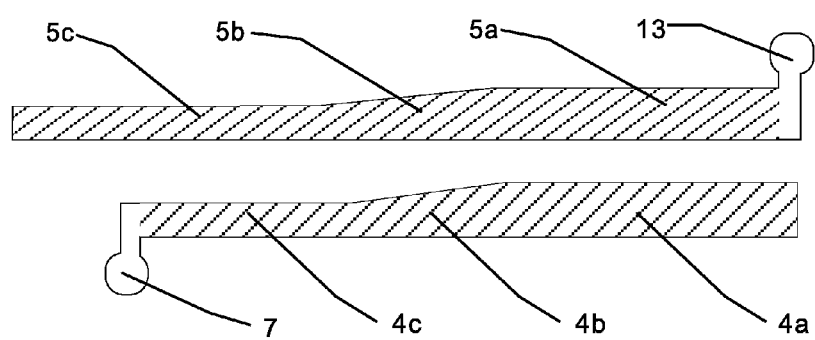
FIG. 6 is the electrodes configuration of present invention, tapered in width with welding tabs.
Figure 7:
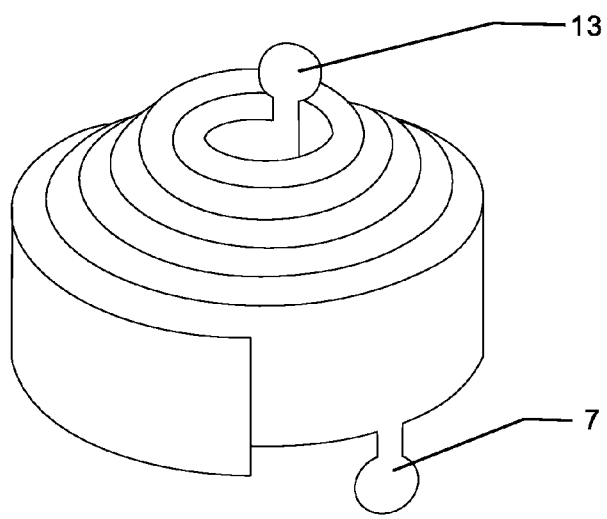
FIG. 7 is the spiral wound electrodes roll of the present invention.

Inside the sealed housing the anode electrode 5 & cathode electrode 4 are spiral wound with separator 6 to be a round or oval roll as FIG. 7. The spiral drawing line in FIG. 7 represents multi-layers of electrodes and separators and just to show the profile of the roll. Said roll is inserted into inner casing 1 and its axis is vertical to the flat top 1a and bottom 3a of the casings, and parallel to the casing side walls. Electrolyte usually having $LiPF_6$ and other solvents is metering pumped into the roll in the inner casing 1 before final battery closing and the electrolyte is absorbed by the electrodes and separator. Some of electrolyte may also spread to the free space in the battery housing after the battery is closed. The electrodes are tapered in width as FIG. 6 with projected welding tabs. The anode electrode 5 is made by a core layer of copper foil as current collector, double side coated with graphite or other lithium intercalating material, and leaving the area of welding tab 13 uncoated. The tab 13 is projected up from the wider end of electrode 5c and further projected from the wound roll of the electrodes, to be welded with inner casing 1a at its center 14, to form a reliable contact of anode to the battery casing. The cathode electrode 4 is made by a core layer of aluminum foil as current collector, double side coated with lithium intercalating materials such as $LiCoO_2$, or $Li(Ni_{1/3}Mn_{1/3}Co_{1/3})O_2$, and leave the area of welding tab 7 uncoated. The tab 7 is projected to the other direction opposite to 13 at the narrower end of electrode 4c and further projected from the wound roll of the electrodes. It can be welded with aluminum flake 10 as FIG. 5, and the flake 10 further to be pressed by gasket 2 on cathode casing 3 to have a reliable connection, after the battery is sealed. Or, the tab 7 can be welded directly to cathode casing 3 as FIG. 8 to form a reliable connection.

As the inner casing 1 has a shoulder 1b for the seal of the battery, the inner height of the battery housing is taller at the center flat area 1a than at the shoulder area 1b. To fully utilize the inner space, the electrodes are designed to be in a tapered shape. For anode 5, 5a is wider and will be in the center of the roll after winding, 5b is tapered to be in the shoulder area after winding, and 5c is narrower to be at the end of the roll after winding. For cathode 4 after winding, 4a in the center is wider to fit 1a, 4b is tapered to adapt 1b, and 4c is narrower at the end of the roll. The width difference between 5a/5c and 4a/4c is about 0.2 mm to 3 mm, more preferably about 0.5 mm to 1.5 mm. The electrodes roll after being wound is as FIG. 7

Separator 6 usually using single layer PE or laminated layers of PP/PE/PP micro-porous membrane at about 12 um to 25 um thickness, is positioned in between of the anode 5 and cathode 4 and wound together to form the roll of round or oval, for different shape of button cell. The width of separator 6 is greater than the width of the electrodes, and the wider separator is pushed down during battery assembly to be wrinkled at the edges as shown in FIG. 5 and FIG. 8.

Two adhesive insulation washers 11 and 12 made by thin polymeric materials could be applied. One is to the inner side of casing 1, and the other one is to the aluminum flake 10 in FIG. 5 or casing 3 in FIG. 8. These insulation washers are extra anti-short means in the button cell, to prevent the short circuit of the electrodes 4 and 5 at its edge to the flat area of the casings or to the aluminum flake 10. Most of such short circuit could be prevented by the extra wider separator 6 at its wrinkled edges, but still the washers could improve further of the reliability of the battery by thoroughly eliminate the possibility of any short of the electrodes to the casings. The washer 12 attached to the inner casing is ring shape, leave a hole at the center for the welding of tab 13 to the inner casing. The other washer 11 applied to the outer casing is round, and is attached to the aluminum flake 10 after the welding of tab 7, as in FIG. 5, or directly attached to the inner surface of 3a after the welding of tab 7, as in FIG. 8. These insulation washers are not essential elements for such battery but are additional means for high reliability.

An aluminum flake 10 in FIG. 5 is applied, and the inventors prefer this embodiment for 2 reasons. First is that the cathode welding tab 7 is quite short in this way, to be welded on the out rim area of 8 of flake 10, because the flake is flat and does not interfere with ultrasonic welding head. This is convenient in assembly process. The flake 10 has the same diameter as the inner diameter of outer casing 3, and just fit into the bottom of 3a when the battery is closed, and the closing force gives pressure at area 9 between 10 and 3a, and forms a reliable contact. The second reason is that such aluminum flake covers the inner surface of 3a, prevents it from contacting to the electrolyte after battery sealed. So during the charge discharge cycles, the inner surface of 3a will not be oxidized by the charging potential and the electrolyte. The battery cycle life is extended. The material of 3a could be selected more freely and usually to use stainless steel commercial grade 316 or 304 or 430. The aluminum flake 10 itself is very resistant to oxidation, because of the nature of aluminum which has compact surface oxidized film protecting it from being further oxidized.

Figure 8:
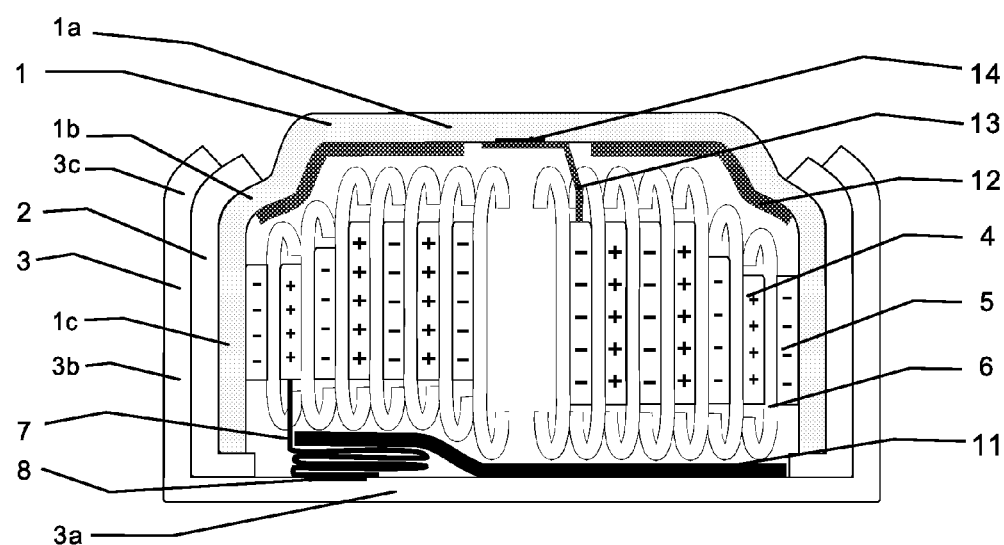
FIG. 8 is a cross-sectional view of the present invention in another embodiment.

If the flake 10 is not applied, as FIG. 8, which is the illustration of the present invention in another embodiment, the cathode welding tab 7 need to be much longer, because if not, the side wall 3b of outer casing 3 would interfere with welding head during assembly. The long tab 7 needs to be folded when the battery is assembled. The 3a inner surface of the cathode casing is exposed to electrolyte after the battery is sealed, and during cycles, the charging potential and the electrolyte could oxidize the 3a inner surface. Usually stainless steel type 316, 304 or 430 is used as the material of casing 3, they are also capable to resist the oxidation of the charging potential and electrolyte but not as good as aluminum. Lithium ion button cell similar to such cathode casing design still could be used, and actually, widely used in the commercial market as FIG. 2, that has about 300 cycles at its 80% remain capacity, and is acceptable for most of the applications.

If the battery is required to have longer cycle life, and in the FIG. 8 configuration, still it could be achieved, by carefully selecting of the cathode casing materials. The principle is to use anti-corrosion material as the inner surface material of cathode casing 3 or at least 3a. One way is to use pure aluminum as the casing 3, the other is to use clad metal or plated metal with aluminum as its surface layer of at least one side, more choice is to use coated metal wherein the coating material is resistant to oxidation such as carbon. The difficulties for these designs are that either pure aluminum or clad metal with aluminum could be quite thick to maintain the strength, and such thickness occupies a significant volume of the battery so the energy density is lowered. Aluminum film by aqueous electrical plating or vacuum spattering coating on stainless steel could be ideal material for the cathode casing 3, but these processes are quite difficult and expensive. Carbon coated metals can also be used, and they are also difficult to make and the coating is fragile in processing.

The "cathode" and "anode" definition could also be swapped in the embodiments of FIG. 5 and FIG. 8. Then the inner casing 1 is cathode, outer casing 3 is anode, electrode 4 is anode, electrode 5 is cathode. In such swapped configuration of FIG. 5 and FIG. 8 the inner casing 1 could be simply stainless steel, and if required with long cycle life, aluminum clad or plated metals, or other anti-corrosion material coated metals could be used. The outer casing 3 is anode and could be simply stainless steel or plated steel, and the flake 10 in FIG. 5 could be more freely selected from metals such as copper, nickel or stainless steel besides aluminum. Those skilled in the art could see such swapped electrodes designs are equivalent to above detailed explained embodiments.

Example 1

As per FIG. 5, inventors of the present invention manufactured some lithium-ion rechargeable button cell size 7840 at diameter 7.8 mm height 4.0 mm as per the details disclosed in the above description.

Battery casings 1 and 3 are made by stainless steel grade 316, 304 or 430, preferably 304, of 0.10 mm to 0.15 mm thick, preferably at 0.125 mm thick. The anode casing side wall 1c is single wall. Gasket 2 is made by injected polypropylene at 0.06 mm to 0.15 mm thick, preferably at 0.12 mm thick.

Vacuum mix the cathode lithium-intercalating materials preferably $Li(Ni_{1/3}Mn_{1/3}Co_{1/3})O_2$ and other functional additives in NMP solvent thoroughly, and coat the slurry double sided on the aluminum foil usually 10 um to 25 um thick preferably 16 um thick, heat to dry the coated materials and press it by a calendering machine to get the desired thickness usually 0.1 mm to 0.2 mm. The coating is not on full area of the aluminum foil leaving a blank area uncoated for the battery tab 7. Then the electrode is cut by punching machine or preferably by laser cutting machine to be desired figuration as FIG. 6. Anode electrode is made in the similar way except the coating lithium-intercalating material is graphite and the current collector metal foil is copper at 8 um to 12 um thick most preferably at 10 um.

Both electrodes 4 and 5 are spiral wound on winding machine together with separator 6, usually 12 um to 25 um thick PE or PP/PE/PP laminated microspores membrane, preferably 20 um. The separator 6 is about 0.5 mm to 1.5 mm wider than the electrodes 4 and 5 to prevent short. The finished wound roll is as FIG. 7 with 2 welding tabs projected. Turn and press down the anode tab 13 on the winding hole and insert the roll into anode casing 1 wherein a ring-like insulation washer 12 already attached. Spot weld the tab 13 on casing 1 by insert the welding pin into the winding hole. Put the gasket 2 pre-coated with battery sealant onto the outside surface of anode casing 1 till the footing rim touching the opening edge of 1c. Aluminum flake 10 at thickness 0.02 mm to 0.10 mm preferably 0.05 mm and at diameter same as the inner diameter of cathode casing 3 is welded at its out rim 8 with cathode tab 7 by ultrasonic. Then attach the insulation washer 11 to cover the welded side of the flake 10.

Such sub-assembly is put into vacuum oven to dry for 24 hours to eliminate water. Then put it into dry glove box wherein the relative humidity of the air is less than 1% to fill electrolyte usually $LiPF_6$ in solvents by a metering pump. Properly turn the flake 10 down at the center of the roll to cover the opening end of said sub-assembly, then put the cathode casing 3 onto the sub-assembly and press them down together to the right height. Then use closing machine to crimp the outer casing opening 3c down to finally seal the battery. After that the battery is stored for 48 hours aging and to the formation process to be very slowly charged and the battery is ready to be tested.

The 7840 batteries were tested at room temperature. The capacity is 16 mAh at 8 mA discharge average voltage 3.6V to end voltage 2.75V after being fully charged to 4.2V. Total energy 58 mWh and volumetric energy density is 300 Wh/L. Remaining capacity is 90% after 400 cycles and test ongoing. Estimate it will have 800 to 1000 cycles to 80% remaining capacity. Impedance is about 1.2 to 2.0 Ohms at AC 1000 Hz. Such battery is small enough to fit into the mini hearing aid and capable to power it for 2 to 3 years.

Example 2

As per FIG. 8, most of the parts, materials and procedures are the same as example 1, except that the cathode tab 7 is longer and welded directly to the inside of 3a, and folded when put the outer casing 3 closing together with the sub-assembled electrodes and inner casing 1. The insulation washer 11 is attached on the electrodes roll edges at the outer casing side, after the electrolyte is filled. The material of 3a is using stainless steel grade 304 in this example, and it could be other grade stainless steel, or other materials like aluminum coated or laminated clad metals, or other anti-corrosion material coated metals.

The 7840 battery made in this example has the similar performance as example 1, except that the remaining capacity is lower than example 1 after same number of cycles. Estimate it will have 400 to 600 cycles to 80% remaining capacity.

We claim:

1. A rechargeable lithium ion button cell comprises:
   (a). a sealed housing comprising an inner casing and an outer casing, both casings having at least one flat area as top or bottom of the battery, and a round or oval side wall vertically formed to the flat area, said side walls are single wall not folded double walls;
   (b). said sealed housing also comprising a round or oval insulation gasket having a footing rim and positioning between said side walls, said footing rim covering the opening end of said inner casing side wall;
   (c). a first electrode and a second electrode inside the said sealed housing being spiral wound with separator to be a round or oval roll, said roll axis is vertical to the said flat areas of the casings;
   (d). said electrodes respectively has a small part of metal projected out of the main body of said electrodes acting as a welding tab;
   wherein a metal flake, which is separate from said outer casing and has exact the same shape of the inner flat area of said outer casing, is welded with said welding tab of the first electrode, and said metal flake is pushed by the inner flat area of said outer casing onto the opening end of said inner casing and pressed against said gasket footing rim, to have reliable contact to said outer casing and sealed inside the battery housing therewith;
   wherein said metal flake enables said welding tab of the first electrode having only one 90 degree turn from a direction of said roll axis at a point out of the main body of said spiral wound electrodes, to a direction of the flat area of the battery outer casing, to have its length to be least thereafter.

2. The cell of claim 1, wherein said second electrode is welded to the inner casing.

3. The cell of claim 1, wherein said second electrode contacts the inner side wall of said inner casing.

4. The cell of claim 1, wherein said flake material is selected from the group consisting of aluminum, copper, nickel, stainless steel, nickel plated steel, aluminum plated metal, aluminum clad metal, carbon coated metal, and alloys of these metals thereof.

5. The cell of claim 1, wherein two insulation washers are applied, the first insulation washer being applied to the inside surface of inner casing top, the second insulation washer being applied to the said metal flake on its welded side.

6. The cell of claim 1, wherein said two electrodes comprise current collectors of metal foils coated with lithium-intercalating active materials, leaving small area of uncoated metal foils as welding tabs.

7. The cell of claim 6, wherein said two electrodes are tapered in width, and the width of wider end is 0.2 mm to 2 mm greater than the width of narrower end.

8. The cell of claim 6, wherein said welding tabs are vertically projected from the main body of the electrodes.

9. The cell of claim 1, wherein said electrodes and separator being filled with liquid electrolyte, or polymer electrolyte.

10. The cell of claim 1, wherein said separator is polymer electrolyte.

* * * * *